US012601717B2

(12) United States Patent (10) Patent No.: US 12,601,717 B2

Oberndorfer et al. (45) Date of Patent: Apr. 14, 2026

---

(54) SYSTEM AND METHOD FOR ANALYZING A MATERIAL

(71) Applicant: SUPPLYZ Holding B.V., The Hague (NL)

(72) Inventors: Fabian Oberndorfer, Kangasala (FI); Eshagh Kargar, Vantaa (FI); Felix Wassmann, The Hague (NL)

(73) Assignee: SUPPLYZ Holding B.V., The Hague (NL)

( * ) Notice: Subject to any disclaimer, the term of this patent is extended or adjusted under 35 U.S.C. 154(b) by 278 days.

(21) Appl. No.: 18/371,664

(22) Filed: Sep. 22, 2023

(65) Prior Publication Data

US 2024/0102972 A1 Mar. 28, 2024

(30) Foreign Application Priority Data

Sep. 23, 2022 (EP) ..................................... 22197530

(51) Int. Cl.
   *G01N 29/44* (2006.01)
   *G01N 29/04* (2006.01)
(52) U.S. Cl.
   CPC ......... *G01N 29/4472* (2013.01); *G01N 29/04* (2013.01); *G01N 2291/023* (2013.01); *G01N 2291/0289* (2013.01)
(58) Field of Classification Search
   CPC ............... G01N 29/4472; G01N 29/04; G01N 29/2481; G01N 29/4481; G01N 2291/0258; G01N 2291/2695; G01N 2291/0289; G01N 2291/023
   USPC .......................................................... 73/632
   See application file for complete search history.

(56) References Cited

U.S. PATENT DOCUMENTS

| | | | | |
|---|---|---|---|---|
| 5,894,266 A | * | 4/1999 | Wood, Jr. ............. | G06K 7/0008 340/991 |
| 6,122,042 A | * | 9/2000 | Wunderman ........ | A61B 1/0607 356/73 |
| 6,536,553 B1 | * | 3/2003 | Scanlon ................. | G01V 1/047 73/639 |

(Continued)

FOREIGN PATENT DOCUMENTS

WO 2021136872 A1 7/2021

OTHER PUBLICATIONS

Epo, Extended European Search Report mailed Jan. 26, 2024 in European Appln. No. 23199173.8, (8 p.).

*Primary Examiner* — Jacques M Saint Surin
(74) *Attorney, Agent, or Firm* — Siritzky Law, PLLC

(57) ABSTRACT

The present invention relates to a device for detecting and/or analyzing an object or a material, wherein the device comprises a receiver configured to detect a first signal, the first signal being generated, at least in part, by vibrations of at least a part of the material or the object, and the device configured to communicate with a remote component, and to send a signal based, at least in part, on the first signal to the remote component. The present invention also relates to a remote component configured to communicate with a device, wherein the remote component is configured to at least receive data from the device and, based thereon, to determine data related to a material or an object, a system comprising the device and the remote component, a corresponding method, and a use of the system and method to detect and/or analyze the object or the material of a container.

19 Claims, 4 Drawing Sheets

(56) References Cited

U.S. PATENT DOCUMENTS

| | | | |
|---|---|---|---|
| 6,657,535 B1 * | 12/2003 | Magbie | B60R 25/102 |
| | | | 340/5.31 |
| 7,246,521 B2 | 7/2007 | Kim | |
| 7,512,981 B2 * | 3/2009 | Pearson | H04L 41/28 |
| | | | 726/23 |
| 8,937,534 B2 * | 1/2015 | Kreiner | G06F 3/0481 |
| | | | 340/12.23 |
| 8,994,546 B2 | 3/2015 | Breed et al. | |
| 9,176,223 B2 * | 11/2015 | Derham | G01S 13/04 |
| 10,990,901 B2 * | 4/2021 | Deo | G06N 20/00 |
| 11,687,827 B2 * | 6/2023 | Pondicherry Murugappan | G06Q 10/10 |
| | | | 706/11 |
| 2014/0123761 A1 | 5/2014 | Turner et al. | |
| 2017/0030863 A1 | 2/2017 | Holmes et al. | |

* cited by examiner

SYSTEM AND METHOD FOR ANALYZING A MATERIAL

CROSS-REFERENCE TO RELATED APPLICATIONS

This application claims priority from European Patent Application No. 22197530.3, filed Sep. 23, 2022, the entire contents of which are hereby fully incorporated herein by reference for all purposes.

FIELD

The present invention relates generally to the field of material analysis. More particularly, it relates to a system and method for non-invasive detection and/or analysis of a material.

BACKGROUND

Various methods for the investigation and analysis of materials are known. A common typical process for analyzing materials comprises sending a probe light pulse at the material and detecting the reflected pulse. For example, systems such as radar and lidar make use of this process for detecting and/or analyzing materials or objects. Electromagnetic radiation of varying frequencies is similarly used to probe a variety of materials, including the muscular/skeletal structure of human bodies. An advantage of using electromagnetic radiation may be the high speed at which signals propagate and the ability of several materials to reflect electromagnetic radiation.

A relevant exception, however, that may not allow detection and/or analysis by electromagnetic radiation may comprise cases where an inside of an object is to be probed but the external surface of the object significantly reflects electromagnetic radiation. In particular, for example, electromagnetic radiation may not be very useful in probing contents of stainless-steel containers that are widely used in the shipping industry, unless they are deployed inside the container, or identifying defects such as cracks and pores in manufactured metal objects. For example, time-of-flight detectors may be used to detect a filling level of the container. However, such detectors may not be able to communicate with an external component by means of electromagnetic radiation that may lead to delays in transmitting results of the measurements. In another example, existing technologies may be used to find defects in metal objects, but those solutions are time-consuming, and may rely on subjective assessment by skilled labor.

The ability to probe the contents of the stainless-steel containers and other (metal) objects both externally and non-invasively may be of significant advantage. In particular, it may be of advantage in allowing fast transmission of measurement results by means of electromagnetic radiation and for probing an integrity of the containers and other objects themselves. It may also be of advantage in improving the reliability and efficiency of a shipping process or to improve quality control processes in terms of automation, speed, and efficiency.

SUMMARY

The present invention seeks to overcome or at least alleviate the shortcomings and disadvantages of the prior art. More particularly, it is an object of the present invention to provide a system comprising a device and a remote component, and a method for non-invasive detection and/or analysis of a material. The material may generally comprise any material. However, embodiments of the present technology may be of particular relevance for probing the material of a container or a (metal) object. For example, these metal objects may include engine parts manufactured for the automotive, maritime, or aviation industries. The present invention relates to aspects that may be used to improve the efficiency and/or reliability of a shipping process or a quality control process.

The present invention also relates to aspects that may provide a new method to probe materials. Embodiments of the present technology may be of advantage in determining the nature of materials and/or of contents of a closed object. Note that, in the following, the term "material" may be understood to comprise the term "object", unless explicitly stated.

According to a first aspect, the present invention relates to a device for detecting and/or analyzing an object or a material, wherein the device comprises a receiver configured to detect a first signal. The object or the material may generally comprise any object or material. Preferably, the object or the material may comprise an elastic object or material. The object or the material may comprise any of a solid, a liquid, or a gas. Preferably, the object or the material may comprise a solid.

The first signal may be generated, at least in part, by the object or the material.

The first signal may be generated, at least in part, by vibrations of at least a part of the material or the object. Thus, the first signal may generally be understood to be generated, at least in part, by an acoustic signal. An acoustic signal may be understood to comprise a signal sustained by a medium. Typical acoustic signals include pressure signals, or sound signals. Preferably, the first signal may be generated by a sound signal.

The device may comprise a signal emitter configured to emit a second signal. The signal emitter may comprise, for example, a signal generator such as any of a function generator, an RF and microwave signal generator, a pitch generator, an arbitrary waveform generator, a digital pattern generator, or a frequency generator. In particular, the signal emitter may be configured to accept one or more parameters and to generate a signal based on the accepted parameter(s). Note that the first signal need not be detected prior to the second signal—generally, the receiver may detect signals also in the absence of any signal emitted by the signal emitter.

The first signal may be based, at least in part, on a response to the second signal. In other words, the receiver may detect a signal that is based, at least in part, on a response to the signal emitted by the signal emitter. However, it may be understood, that the first signal detected by the receiver may not comprise a response to the second signal, and may comprise a signal generated in the absence of the second signal. This may be of advantage when detecting, for example, signals generated by an environment of the receiver.

The response may comprise, at least in part, a response of the material or the object. The material or the object may respond to the second signal emitted by the signal emitter, and this response, or at least a part thereof, may be detected by the receiver.

The response of the object or the material may be generated, at least in part, by vibrations of at least a part of the object or the material. The response of the object or the material may comprise an acoustic response, generated by vibrations/reverberations of the material or the object. The device may be of particular advantage in determining a characteristic of, or generally data related to, the material or the object based, at least in part, on this acoustic response.

The object or the material may be in communication with a component. For example, the object or the material may comprise two faces, one of which may be in communication with the device, and the other with the component. The component may comprise any of a solid, a liquid, or a gas. Communication with the component may be understood to comprise exchange of energy between the material or the object, and the component. As may be appreciated, this may or may not imply contact with the component.

The object or the material may be in contact with a component.

The device may be configured to determine data related to the component. That is, the device may be configured to detect the first signal generated, at least in part, by the material or the object and, based thereon, to determine information related to the component. For example, the material or the object may comprise a wall of a container filled, at least in part, by a liquid, and the device may be configured to determine a filling level of the container. As another example, the object may be manufactured of different metal alloys and may comprise any shape, and may be manufactured using processes such as casting, forging, welding, pressing, machining, or additive manufacturing.

The device may be configured to communicate with a remote component. The remote component may comprise a computer, a smartphone, a tablet, a laptop, or any other suitable data processing apparatus. The remote component may be located in close proximity to the device or may be based in a cloud.

The device may be configured to send a signal based, at least in part, on the first signal to the remote component. For example, the signal sent by the device may comprise only a part of the first signal, such as a maximum amplitude of the first signal detected. Alternatively, the device may send the entire first signal to the remote component. The signal actually sent may depend on various factors, such as a speed of sending data to the remote component, or data (related to the material or the object) to be determined.

The signal emitter may be configured to emit the second signal based on a defined signal. The defined signal may comprise a control parameter. The defined signal may comprise a plurality of control parameters. The defined signal may be understood to comprise a set of one or more control parameters that may be used to generate the second signal. Thus, the set of control parameters may be understood to be in one-to-one correspondence to the defined signal.

The signal emitter may be configured to emit a plurality of second signals. That is, the signal emitter may emit a plurality of signals with a non-zero time interval between successive emissions of the signal. Each of the plurality of second signals emitted may be based on the defined signal.

The receiver may be configured to detect a first signal based, at least in part, on a response to the second signal for each of the plurality of second signals. That is, the receiver may detect a signal based, at least in part, on the response to the signal emitted by the signal emitter, for each of the plurality of second signals. Thus, generally, the receiver may detect a plurality of first signals.

A time interval between any two successive second signal emissions may be significantly identical. For example, the identical time interval may be 12 hours, so that the signal emitter may emit a signal (based on the defined signal) every 12 hours.

A time interval between successive second signal emissions may be variable. For example, the time interval between a first and a second emission of the signal may be 12 hours, while the time interval between a third and a further emission of the signal may be 11 hours.

The first signal may comprise an electrical signal. Thus, generally, the receiver may be understood to comprise means capable of converting an acoustic signal to an electrical signal. For example, the receiver may comprise any microphone generally known in the art.

The second signal may comprise an electrical signal.

The device may comprise a processing component. The processing component may be configured for data processing. For example, the processing component may comprise a microprocessor. The processing component may further comprise a memory unit configured to store data. The memory unit may store, for example, the control parameter(s) for the second signal.

The processing component may be configured to trigger the signal emitter to emit the second signal. Thus, the processing component may be of advantage in controlling the time interval between successive emissions of the second signal as described further below.

The processing component may be configured to accept, as input, the control parameter.

The processing component may be configured to send the control parameter to the signal emitter.

The processing component may be configured to accept, as input, the fixed time interval between successive emissions of the signal.

The processing component may be configured to accept, as input, a starting time interval and a rate of change of the time interval between successive emissions of the signal. The processing component may, for example, trigger emission of the second signal, look up the last time interval, determine the next time interval based on the rate of change of the time interval and the last time interval, and let the next time interval elapse before triggering the next emission of the second signal.

The processing component may be configured to accept, as input, a table of time intervals between successive emissions of the signal. The processing component may, for example, trigger emission of the second signal, look up the next time interval, and let the next time interval elapse before triggering the next emission of the second signal.

The device may be configured to detect the response for a listening duration after emission of the second signal. That is, the receiver may be configured to detect a signal for the listening duration after the emission of the second signal. In particular, the signal detected in the listening duration may be of advantage in associating the detected first signal with a corresponding emitted second signal. Based on this association, for example, an expected response signal may be generated (as described below) and compared to the signal detected in the listening duration, or at least a part thereof.

The processing component may be configured to accept, as input, the listening duration of the device.

The listening duration may be between 0.05 and 20 seconds, preferably between 0.2 and 5 seconds, further preferably between 0.5 and 3 seconds. A larger listening duration may be more resource-inefficient but may allow more accurate and robust detection and/or analysis of the material or the object.

The first signal may have an amplitude between 1V and 150V, preferably between 2V and 50V, further preferably between 3V and 20V. A minimum amplitude of the first signal may indicate a threshold below which signals may not be detected by the device. A smaller threshold may allow detection of low energy (frequency) signals, but may also be more contaminated by noise.

The device may comprise a communication unit. The communication unit may comprise, for example, a radio module. The communication unit may be configured for wireless or wired communication.

The communication unit may be configured to at least send data to the remote component. The data may be sent wirelessly, or over a wired connection.

The communication unit may be configured to at least receive data from the processing component. The processing component may be configured to at least send data to the communication unit.

The device may comprise an actuator. The actuator may be configured to apply a mechanical force on the material or the object.

The actuator may be configured to move in response to a signal, preferably an electrical signal. The actuator may comprise a piezoelectric material, such as Lead Zirconate Titanate, Barium Titanate, Lead Titanate, Bismuth Sodium Titanate, or any other suitable piezoelectric materials. Alternatively, the actuator may comprise a magnetic material that may be configured to move in response to a changing electric field.

The signal emitter may be configured to send the second signal to the actuator. Thus, the signal emitter may be used to effect a desired motion of the actuator.

The receiver may be configured to receive a signal from the actuator.

The signal received from the actuator may comprise an electrical signal. For example, in a piezoelectric actuator, mechanical strain on the actuator may be converted to an electric potential.

The response may comprise, at least in part, a response of the actuator to the second signal. In other words, the response may comprise, at least in part, the response of the actuator to the second signal. This response, generated at almost the same time as emission of the second signal, may be called a signal response of the actuator and may be of advantage in detecting and/or analyzing the object or the material. For example, the signal response of the actuator to the second signal in absence of the object or the material may be measured. Then, the signal response of the actuator to the second signal in presence of the object or the material may be measured. By comparing these two measurements, a characteristic such as an impedance of the object or the material may be determined.

The device may be configured to measure a position of the actuator.

The actuator may comprise a piezoelectric material.

The device may comprise a membrane configured to vibrate in response to a mechanical force. Preferably, however, the device may not comprise a membrane.

The actuator may be configured to apply a mechanical force on the membrane.

The membrane may be configured to apply a mechanical force on the actuator.

The processing component may be configured to generate a transmitted signal based, at least in part, on the first signal detected by the receiver. As described above, the transmitted signal may comprise, for example, only a maximum amplitude of the signal detected. Or, for example, the transmitted signal may comprise only a maximum frequency of the signal detected.

The transmitted signal may be based, at least in part, on the measured position of the actuator.

The processing component may be configured to send at least a part of the transmitted signal to the communication unit. The processing component may be programmed to determine the part of the detected signal to send as the transmitted signal to the communication unit.

The processing component may be configured to send the control parameter to the communication unit. The processing component may preferably send all the control parameters to the communication unit. This may be of advantage in determining the (second) signal emitted by the signal emitter.

The device may be configured to send the measured position of the actuator to the communication unit. This may be of advantage in determining a response of the actuator.

The device may comprise a source of energy such as a battery. The battery may comprise a rechargeable battery. Alternatively, or additionally, the device may be connected to an electrical grid. For example, the device may be powered by a wired connection to the grid.

A capacity of the source of energy may be between 50 mWh and 100 Wh, preferably between 75 mWh and 75 Wh, further preferably between 100 mWh and 50 Wh. A larger capacity may allow larger lifetime of the device, but may also be bigger and heavier.

The second signal, or at least a part thereof, may be used to generate an acoustic signal. For example, the second signal may be used to effect an oscillatory motion of the actuator that may impinge on the material or the object, thereby generating an acoustic signal in the material or the object.

The first signal may be generated, at least in part, by an acoustic signal. The oscillating material or the object may impinge on the receiver, or at least a membrane thereof, thereby generating, at least in part, the (first) signal detected by the receiver.

The device may be configured to be arranged on to the material or the object. For example, the device may be glued on to the material or the object.

The shortest distance between the device and the material or the object may be less than 30 mm, preferably less than 20 mm, further preferably less than 10 mm, yet further preferably less than 5 mm.

The device may be arranged on to the material or the object such that the shortest distance between the membrane and the material or the object is less than 30 mm, preferably less than 20 mm, further preferably less than 10 mm, yet further preferably less than 5 mm.

According to a second aspect, the present invention relates to a remote component configured to at least receive data from a device and, based thereon, to determine data related to a material or an object. The remote component may comprise a data processing apparatus, such as a computer, a laptop, a tablet, a smartphone, a cloud server, or any other suitable apparatus.

The device may comprise the device according to any of the preceding device embodiments.

The remote component may comprise a remote communication unit configured to at least receive data from the device. The remote communication unit may, for example, also comprise a radio module.

The remote component may comprise a data processing unit configured to process input data.

The data processing unit may be configured to at least receive input data from the remote communication unit and, based thereon, to determine the data related to the material or the object.

The input data received from the remote communication unit may comprise any of the at least part of the transmitted signal, the control parameter and/or the defined signal, or the measured position of the actuator. As described above, the defined signal and the set of control parameters may be considered isomorphic. However, in embodiments, only one of the defined signal and the set of control parameters may be received by the data processing unit.

The data processing unit may be configured to determine a spectral content of the input data. The spectral content of the input data may be determined, for example, by means of a Fast Fourier Transform.

The data processing unit may be configured to partition the input data into a plurality of sections and to determine the spectral content of each of the plurality of sections. The sections may be understood to comprise parts of the input data contiguous in time. By determining the spectral content of different sections of the input data, information about a temporal behavior of the frequency response may be determined.

The data processing unit may be configured to determine the data related to the material or the object by means of a model.

The model may be based, at least in part, on physical laws. For example, the data received from the device may be used to determine a speed of propagation of sound in the material or the object. Based on the physical relationship between speed of sound and density, the model may determine, for example, the density of the material or the object.

The model may be based, at least in part, on numerical simulations. Numerical simulations may be of advantage in modeling the situation when the material or the object forms part of a complex object. Numerical simulations may be used, for example, to determine phenomenological relationships between an extension of the material or the object in a given direction (with respect to a motion of the actuator, for example) and a run time of the acoustic signal generated by the actuator. The phenomenological relationship may be used to determine, for example, a location of a crack in the material or the object.

The model may be configured to determine an expected response signal based, at least in part, on the defined signal, or the control parameter thereof. For example, the model may be used to predict a maximum frequency in the response signal given a maximum frequency of the emitted signal.

The data processing unit may be configured to compare the expected response signal, or a part thereof, to the at least part of the transmitted signal.

The data processing unit may be configured to determine the data related to the material or the object based, at least in part, on a result of the comparison between the expected response signal, or a part thereof, to the at least part of the transmitted signal. For example, the predicted maximum frequency may be compared with the detected maximum frequency and, based thereon, data related to the material or the object may be determined.

The model may comprise, at least in part, an artificial intelligence-based model. An artificial intelligence-based model may be of particular advantage in determining the data related to the material or the object as modeling the detected signal exactly may be quite complex and time/energy inefficient. The artificial intelligence-based model may comprise a simple model such as a regression model, or it may comprise a more complex, learning-based model.

The artificial intelligence-based model may comprise a model based on supervised learning. For example, the artificial intelligence-based model may be trained based on data for which a desired output is already known. The artificial intelligence-based model may be configured to output the desired output by means of such data.

The artificial intelligence-based model may comprise a model based on unsupervised learning. For example, the artificial intelligence-based model may be trained using unsupervised learning methods, to learn more about input data (acoustic or sound) and extract more representative features. The artificial intelligence-based model, thus tuned, may then be fine-tuned using supervised learning methods. This may be of advantage in labeling lesser data and using unlabeled data to learn a representation for acoustic or sound data. At least a part of the thus-trained artificial intelligence-based model may be used to transfer that knowledge using transfer learning.

The artificial intelligence-based model may comprise a neural network.

The neural network may comprise any of a convolutional neural network, a recurrent neural network, or a transformer.

An input to the artificial intelligence-based model may comprise the at least part of the transmitted signal.

An output of the artificial intelligence-based model may comprise a label.

The output of the artificial intelligence-based model may comprise a plurality of labels. Each of the plurality of labels may be used to determine distinct data related to the material or the object. For example, one label may be used to determine data about a nature of the material or the object, another label may be used to determine data about an object of which the material may be a part.

The remote component, particularly the data processing unit thereof, may be configured to determine the data related to the material or the object based, at least in part, on the label. The label may be used, for example, to classify the material or the object into one of a plurality of classes. The classes may relate, for example, to a nature of the material or the object such as metallic or non-metallic. The classes may also relate to a characteristic of an object of which the material may be a part. For example, the material may be the material of a container, and the classes may relate to whether or not the container is closed. As another example, the device may be used to analyze an object and the classes may relate to a type of defect in the object, a material fatigue of the object, a defect size and/or location in the object.

The remote component may comprise a memory unit.

The data processing unit may be configured to use training data to train the artificial intelligence-based model.

The memory unit may be configured to store the training data.

The training data comprise a data element comprising a signal and a correct label. A correct label may be understood to comprise a desired label to be output for the signal.

The data element may comprise a plurality of correct labels. Each of the plurality of correct labels may correspond to each of the plurality of labels that may be predicted by the artificial intelligence-based model as described above.

The training data comprise a plurality of data elements. Data augmentation techniques may be used to generate new data elements for the training data and, thus, to improve a performance of the artificial intelligence-based model.

The data processing unit may be configured to predict the label for a data element of the training data.

The data processing unit may be configured to compare the predicted label for the data element with the correct label. Based on the comparison, a performance metric such as an error, an F1-score, or another suitable performance metric of the artificial intelligence-based model may be determined.

The data processing unit may be configured to update the artificial intelligence-based model based on a result of the comparison of the predicted label and the correct label for the data element.

The memory unit may be configured to store the model.

According to a third aspect, the present invention relates to a system for detecting and/or analyzing a material or an object, the system configured to detect a first signal, and to determine, based at least on a part of the first signal, data related to the material or the object.

The system may be further configured to emit a second signal, wherein the first signal may be based, at least in part, on a response to the second signal.

The response may comprise, at least in part, a response of the material or the object to the second signal.

The system may comprise a device according to any of the preceding device embodiments.

The system may comprise a remote component according to any of the preceding remote component embodiments.

According to a fourth aspect, the present invention relates to a method for detecting and/analyzing a material or an object, the method comprising detecting a first signal, and determining, based at least on a part of the first signal, data related to the material or the object.

The method may comprise emitting a second signal based on a defined signal.

The first signal may be based, at least in part, on a response to the second signal.

The method may comprise transforming the detected first signal, or at least a part thereof, to generate a transmitted signal.

The method may comprise using a model to determine the data related to the material or the object.

The model may be based, at least in part, on physical laws.

The model may be based, at least in part, on numerical simulations.

The method may comprise determining, using the model, an expected response signal based, at least in part, on the defined signal.

The method may comprise comparing the expected response signal, or at least a part thereof, with the transmitted signal, or at least a part thereof.

The method may comprise determining the data related to the material or the object based, at least in part, on a result of the comparison between the expected response signal, or at least a part thereof, with the transmitted signal, or at least a part thereof.

The model may comprise, at least in part, an artificial intelligence-based model.

The method may comprise sending the transmitted signal, or at least a part thereof, to the artificial intelligence-based model.

The method may comprise predicting, using, at least in part, the artificial intelligence-based model, a label for the transmitted signal, or at least a part thereof.

The method may comprise determining the data related to the material or the object based, at least in part, on the predicted label.

The first signal may be generated, at least in part, by an acoustic signal.

The second signal, or at least a part thereof, may be used to generate an acoustic signal.

The system as described above may be configured to perform the as described above.

According to a fifth aspect, the present invention relates to a use of a system to detect and/or analyze an object or a material of a container. The system may comprise a system as described above. A container may be generally understood to comprise an object comprising a plurality of walls abutting a section. The plurality of walls may at least comprise a first wall abutting the section below and a second wall abutting the section on the side. The device may be arranged on to a wall of the container, such as a side wall, such that the actuator may impinge on the wall. The actuator may cause the wall, or at least a part thereof, to vibrate in response to the emitted (second) signal. The receiver may then detect an acoustic response of the container, or at least of a part of the side wall thereof, and based on the acoustic response determine data related to the container.

An object may be understood to comprise a metallic object such as an engine part, a welded structure, a metal profile, or any other suitable metallic object. However, objects may also comprise non-metallic objects.

The device may be arranged to the object, such that the actuator may impinge the object.

The object or the material of the container may be actuated with one device or with several devices, either simultaneously or in a sequence.

The system may be used to detect a humidity inside the container, or inside the object.

The container may comprise a lid. The lid may be configured to abut the section above.

The system may be used to detect whether or not the container is closed. That is, the system may be used to detect whether or not the lid is put on the container.

The system may be used to detect a filling level of the container. For example, the container may be used to hold a powder and may be wholly, partially, or not filled with the powder. Depending on the filling level of the container, the acoustic response of the container may vary and may be used to determine the filling level.

The system may be used, in response to the container not being empty, to detect a particle size of contents of the container.

The system may be used to find an anomaly and/or a defect in the object or in the material of the container. The anomaly may comprise any of a fracture, a pore, an air pocket, a missing part, a geometry error, a crack, a weld imperfection, or tension. However, in some embodiments, other anomalies may also be detected.

The system may be used to determine a structural integrity of a structure and to determine a change of the structural integrity over time. For example, the system may be used to monitor development of corrosion, erosion, hydrogen embrittlement, tension, or other material fatigue in pipes, pipelines, bridges, wind turbines, or other structures.

The present invention is also defined by the following numbered embodiments.

Below device embodiments will be discussed. These are abbreviated by the letter 'D' followed by a number. Whenever reference is herein made to 'device embodiments', these embodiments are meant.

D1. A device for detecting and/or analyzing an object or a material, wherein the device comprises a receiver configured to detect a first signal.

D2. The device according to the preceding embodiment, wherein the first signal is generated, at least in part, by the material or the object.

D3. The device according to the preceding embodiment, wherein the first signal is generated, at least in part, by vibrations of at least a part of the material or the object.

D4. The device according to the preceding embodiment, wherein the device comprises a signal emitter configured to emit a second signal.

D5. The device according to the preceding embodiment, wherein the first signal is based, at least in part, on a response to the second signal.

D6. The device according to any of the preceding embodiments and with the features of embodiment D4, wherein the response comprises, at least in part, a response of the material or the object.

D7. The device according to the preceding embodiment, wherein the response of the material is generated, at least in part, by vibrations of at least a part of the material or the object.

D8. The device according to any of the preceding device embodiments, wherein the material or the object is in communication with a component.

D9. The device according to any of the preceding device embodiments, wherein the material or the object is in contact with a component.

D10. The device according to any of the 2 preceding embodiments, wherein the device is configured to determine data related to the component.

D11. The device according to any of the preceding device embodiments, wherein the device is configured to communicate with a remote component.

D12. The device according to the preceding embodiment, wherein the device is configured to send a signal based, at least in part, on the first signal to the remote component.

D13. The device according to any of the preceding device embodiments and with the features of embodiment D4, wherein the signal emitter is configured to emit the second signal based on a defined signal.

D14. The device according to any of the preceding device embodiments and with the features of embodiment D4, wherein the signal emitter is configured to emit a plurality of second signals.

D15. The device according to the preceding embodiment and with the features of embodiment D5, wherein the receiver is configured to detect a first signal based, at least in part, on the response to the second signal for each of the plurality of second signals.

D16. The device according to any of the 2 preceding embodiments, wherein a time interval between any two successive second signal emissions is significantly identical.

D17. The device according to any of the preceding device embodiments and with the features of embodiment D14, but without the features of the preceding embodiment, wherein a time interval between successive second signal emissions is variable.

D18. The device according to any of the preceding device embodiments, wherein the first signal comprises an electrical signal.

D19. The device according to any of the preceding device embodiments and with the features of embodiment D4, wherein the second signal comprises an electrical signal.

D20. The device according to any of the preceding device embodiments, wherein the device comprises a processing component.

D21. The device according to the preceding embodiment, wherein the processing component is configured to trigger the signal emitter to emit the second signal.

D22. The device according to any of the preceding device embodiments and with the features of embodiment D13, wherein the defined signal comprises a control parameter.

D23. The device according to the preceding embodiment, wherein the defined signal comprises a plurality of control parameters.

D24. The device according to any of the 2 preceding embodiments and with the features of embodiment D20, wherein the processing component is configured to accept, as input, the control parameter.

D25. The device according to the preceding embodiment, wherein the processing component is configured to send the control parameter to the signal emitter.

D26. The device according to any of the preceding device embodiments and with the features of embodiments D16, and D20, wherein the processing component is configured to accept, as input, the fixed time interval between successive emissions of the signal.

D27. The device according to any of the preceding device embodiments and with the features of embodiments D17, and D20, wherein the processing component is configured to accept, as input, a starting time interval and a rate of change of the time interval between successive emissions of the signal.

D28. The device according to any of the preceding device embodiments and with the features of embodiments D17, and D20, but without the features of the preceding embodiment, wherein the processing component is configured to accept, as input, a table of time intervals between successive emissions of the signal.

D29. The device according to any of the preceding device embodiments and with the features of embodiment D5, wherein the device is configured to detect the response for a listening duration after emission of the second signal.

D30. The device according to the preceding embodiment and with the features of embodiment D20, wherein the processing component is configured to accept, as input, the listening duration of the device.

D31. The device according to any of the 2 preceding embodiments, wherein the listening duration is between 0.05 and 20 seconds, preferably between 0.2 and 5 seconds, further preferably between 0.5 and 3 seconds.

D32. The device according to any of the preceding device embodiments and with the features of embodiment D11, wherein the first signal has an amplitude between 1V and 150V, preferably between 2V and 50V, further preferably between 3V and 20V.

D33. The device according to any of the preceding device embodiments, wherein the device comprises a communication unit.

D34. The device according to the preceding embodiment and with the features of embodiment D11, wherein the communication unit is configured to at least send data to the remote component.

D35. The device according to any of the 2 preceding embodiments and with the features of embodiment D20, wherein the communication unit is configured to at least receive data from the processing component.

D36. The device according to any of the preceding device embodiments, wherein the device comprises an actuator.

D37. The device according to the preceding embodiment, wherein the actuator is configured to move in response to a signal, preferably an electrical signal.

D38. The device according to the preceding embodiment and with the features of embodiment D4, wherein the signal emitter is configured to send the second signal to the actuator.

D39. The device according to any of the preceding device embodiments, wherein the receiver is configured to receive a signal from the actuator.

D40. The device according to the preceding embodiment, wherein the signal received from the actuator comprises an electrical signal.

D41. The device according to any of the 2 preceding embodiments and with the features of embodiment D5, wherein the response comprises, at least in part, a response of the actuator to the second signal.

D42. The device according to any of the 3 preceding embodiments and with the features of embodiment D3, wherein the signal received from the actuator is based, at least in part, on vibrations of at least a part of the material or the object.

D43. The device according to any of the preceding device embodiments and with the features of embodiment D36, wherein the device is configured to measure a position of the actuator.

D44. The device according to any of the preceding device embodiments and with the features of embodiment D36, wherein the actuator comprises a piezoelectric material.

D45. The device according to any of the preceding device embodiments, wherein the device comprises a membrane configured to vibrate in response to a mechanical force.

D46. The device according to the preceding embodiment and with the features of embodiment D36, wherein the actuator is configured to apply a mechanical force on the membrane.

D47. The device according to any of the 2 preceding embodiments and with the features of embodiment D36, wherein the membrane is configured to apply a mechanical force on the actuator.

D48. The device according to any of the preceding device embodiments and with the features of embodiment D20, wherein the processing component is configured to generate a transmitted signal based, at least in part, on the first signal detected by the receiver.

D49. The device according to the preceding embodiment and with the features of embodiment D43, wherein the transmitted signal is based, at least in part, on the measured position of the actuator.

D50. The device according to any of the 3 preceding embodiments and with the features of embodiment D35, wherein the processing component is configured to send at least a part of the transmitted signal to the communication unit.

D51. The device according to any of the preceding device embodiments and with the features of embodiments D25, and D35, wherein the processing component is configured to send the control parameter to the communication unit.

D52. The device according to any of the preceding device embodiments and with the features of embodiment D43, wherein the device is configured to send the measured position of the actuator to the communication unit.

D53. The device according to any of the preceding device embodiments, wherein the device comprises a source of energy such as a battery.

D54. The device according to the preceding embodiment, wherein a capacity of the source of energy is between 50 mWh and 100 Wh, preferably between 75 mWh and 75 Wh, further preferably between 100 mWh and 50 Wh.

D55. The device according to any of the preceding device embodiments and with the features of embodiment D4, wherein the second signal, or at least a part thereof, is used to generate an acoustic signal.

D56. The device according to any of the preceding device embodiments, wherein the first signal is generated, at least in part, by an acoustic signal.

D57. The device according to any of the preceding device embodiments, wherein the device is configured to be arranged on to the material or on to the object.

D58. The device according to the preceding embodiment, wherein the shortest distance between the device and the material or the object is less than 30 mm, preferably less than 20 mm, further preferably less than 10 mm, yet further preferably less than 5 mm.

D59. The device according to any of the 2 preceding embodiments and with the features of embodiment D45, wherein the device is arranged on to the material or on to the object such that the shortest distance between the membrane and the material or the object is less than 30 mm, preferably less than 20 mm, further preferably less than 10 mm, yet further preferably less than 5 mm.

Below remote component embodiments will be discussed. These are abbreviated by the letter 'R' followed by a number. Whenever reference is herein made to 'remote component embodiments', these embodiments are meant.

R1. A remote component configured to communicate with a device, wherein the remote component is configured to at least receive data from the device and, based thereon,
to determine data related to a material or an object.

R2. The remote component according to the preceding embodiment, wherein the device comprises the device according to any of the preceding device embodiments.

R3. The remote component according to any of the 2 preceding embodiments, wherein the remote component comprises a remote communication unit configured to at least receive data from the device.

R4. The remote component according to any of the 3 preceding embodiments, wherein the remote component comprises a data processing unit configured to process input data.

R5. The remote component according to the preceding embodiment and with the features of the penultimate embodiment, wherein the data processing unit is configured to at least receive input data from the remote communication unit and, based thereon, to determine the data related to the material or the object.

R6. The remote component according to the preceding embodiment and with the features of embodiment R2, wherein the input data received from the remote communication unit comprises any of the at least part of the transmitted signal, the control parameter and/or the defined signal, or the measured position of the actuator.

R7. The remote component according to any of the 3 preceding embodiments, wherein the data processing unit is configured to determine a spectral content of the input data.

R8. The remote component according to the preceding embodiment, wherein the data processing unit is configured to partition the input data into a plurality of sections and to determine the spectral content of each of the plurality of sections.

R9. The remote component according to any of the preceding remote component embodiments and with the features of embodiment R4, wherein the data processing unit is configured to determine the data related to the material or the object by means of a model.

R10. The remote component according to the preceding embodiment, wherein the model is based, at least in part, on physical laws.

R11. The remote component according to any of the 2 preceding embodiments, wherein the model is based, at least in part, on numerical simulations.

R12. The remote component according to the preceding embodiment and with the features of embodiments R6, and R9, wherein the model is configured to determine an expected response signal based, at least in part, on the defined signal.

R13. The remote component according to the preceding embodiment, wherein the data processing unit is configured to compare the expected response signal, or a part thereof, to the at least part of the transmitted signal.

R14. The remote component according to the preceding embodiment, wherein the data processing unit is configured to determine the data related to the material or the object based, at least in part, on a result of the comparison between the expected response signal, or a part thereof, to the at least part of the transmitted signal.

R15. The remote component according to any of the preceding remote component embodiments and with the features of embodiment R9, wherein the model comprises, at least in part, an artificial intelligence-based model.

R16. The remote component according to the preceding embodiment, wherein the artificial intelligence-based model comprises a model based on supervised learning.

R17. The remote component according to the penultimate embodiment, wherein the artificial intelligence-based model comprises a model based on unsupervised learning.

R18. The remote component according to any of the 3 preceding embodiments, wherein the artificial intelligence-based model comprises a neural network.

R19. The remote component according to the preceding embodiment, wherein the neural network comprises any of a convolutional neural network, a recurrent neural network, or a transformer.

R20. The remote component according to any of the preceding remote component embodiments and with the features of embodiments R6, and R15, wherein an input to the artificial intelligence-based model comprises the at least part of the transmitted signal.

R21. The remote component according to any of the preceding remote component embodiments and with the features of embodiment R15, wherein an output of the artificial intelligence-based model comprises a label.

R22. The remote component according to the preceding embodiment, wherein the output of the artificial intelligence-based model comprises a plurality of labels.

R23. The remote component according to any of the 2 preceding embodiments, wherein the remote component, particularly the data processing unit thereof, is configured to determine the data related to the material or the object based, at least in part, on the label.

R24. The remote component according to any of the preceding remote component embodiments, wherein the remote component comprises a memory unit.

R25. The remote component according to any of the preceding remote component embodiments and with the features of embodiment R16, wherein the data processing unit is configured to use training data to train the artificial intelligence-based model.

R26. The remote component according to the preceding embodiment and with the features of the penultimate embodiment, wherein the memory unit is configured to store the training data.

R27. The remote component according to any of the 2 preceding embodiments, wherein the training data comprise a data element comprising a signal and a correct label.

R28. The remote component according to the preceding embodiment, wherein the data element comprises a plurality of correct labels.

R29. The remote component according to any of the 2 preceding embodiments, wherein the training data comprise a plurality of data elements.

R30. The remote component according to any of the 3 preceding embodiments and with the features of embodiments R21, and R25, wherein the data processing unit is configured to predict the label for a data element of the training data.

R31. The remote component according to the preceding embodiment, wherein the data processing unit is configured to compare the predicted label for the data element with the correct label.

R32. The remote component according to the preceding embodiment, wherein the data processing unit is configured to update the artificial intelligence-based model based on a result of the comparison of the predicted label and the correct label for the data element.

R33. The remote component according to any of the preceding device embodiments and with the features of embodiments R9, and R24, wherein the memory unit is configured to store the model.

Below system embodiments will be discussed. These are abbreviated by the letter 'S' followed by a number. Whenever reference is herein made to 'system embodiments', these embodiments are meant.

S1. A system for detecting and/or analyzing an object or a material, wherein the system is configured
   to detect a first signal, and
   to determine, based, at least in part on the first signal, data related to the material or the object.

S2. The system according to the preceding embodiment, wherein the system is further configured to emit a second signal, wherein the first signal is based, at least in part, on a response to the second signal.

S3. The system according to the preceding embodiment, wherein the response comprises, at least in part, a response of the material or the object to the second signal.

S4. The system according to any the preceding system embodiments, wherein the system comprises a device according to any of the preceding device embodiments.

S5. The system according to any of the preceding system embodiments, wherein the system comprises a remote component according to any of the preceding remote component embodiments.

Below method embodiments will be discussed. These are abbreviated by the letter 'M' followed by a number. Whenever reference is herein made to 'method embodiments', these embodiments are meant.

M1. A method for detecting and/or analyzing an object or a material, wherein the method comprises
   detecting a first signal, and
   determining, based, at least in part on the first signal, data related to the material or the object.

M2. The method according to the preceding embodiment, wherein the method comprises emitting a second signal based on a defined signal.

M3. The method according to the preceding embodiment, wherein the first signal is based, at least in part, on a response to the second signal.

M4. The method according to any of the 3 preceding embodiments, wherein the method comprises transforming the detected first signal, or at least a part thereof, to generate a transmitted signal.

M5. The method according to any of the preceding method embodiments, wherein the method comprises using a model to determine the data related to the material or the object.

M6. The method according to the preceding embodiment, wherein the model is based, at least in part, on physical laws.

M7. The method according to any of the 2 preceding embodiments, wherein the model is based, at least in part, on numerical simulations.

M8. The method according to any of the 3 preceding embodiments and with the features of embodiment M2, wherein the method comprises determining, using the model, an expected response signal based, at least in part, on the defined signal.

M9. The method according to the preceding embodiment and with the features of embodiment M3, wherein the method comprises comparing the expected response signal, or at least a part thereof, with the transmitted signal, or at least a part thereof.

M10. The method according to the preceding embodiment, wherein the method comprises determining the data related to the material or the object based, at least in part, on a result of the comparison between the expected response signal, or at least a part thereof, with the transmitted signal, or at least a part thereof.

M11. The method according to any of the preceding method embodiments and with the features of embodiment M5, wherein the model comprises, at least in part, an artificial intelligence-based model.

M12. The method according to the preceding embodiment and with the features of embodiment M3, wherein the method comprises sending the transmitted signal, or at least a part thereof, to the artificial intelligence-based model.

M13. The method according to the preceding embodiment, wherein the method comprises predicting, using, at least in part, the artificial intelligence-based model, a label for the transmitted signal.

M14. The method according to the preceding embodiment, wherein the method comprises determining the data related to the material or the object based, at least in part, on the predicted label.

M15. The method according to any of the preceding method embodiments, wherein the first signal is generated, at least in part, by an acoustic signal.

M16. The method according to any of the preceding method embodiments and with the features of embodiment M2, wherein the second signal, or at least a part thereof, is used to generate an acoustic signal.

S6. The system according to any of the preceding system embodiments, wherein the system is configured to perform the method according to any of the preceding method embodiments.

Below use embodiments will be discussed. These are abbreviated by the letter 'U' followed by a number. Whenever reference is herein made to 'use embodiments', these embodiments are meant.

U1. A use of a system to detect and/or analyze the material of a container or an object.

U2. The use of a system according to the preceding embodiment, wherein the system is used to detect a humidity inside the container or inside the object.

U3. The use of a system according to any of the preceding use embodiments, wherein the container comprises a lid.

U4. The use of a system according to the preceding embodiment, wherein the system is used to detect whether or not the container is closed.

U5. The use of a system according to any of the preceding use embodiments, wherein the system is used to detect a filling level of the container.

U6. The use of a system according to the preceding embodiment, wherein the system is used, in response to the container not being empty, to detect a particle size of contents of the container.

U7. The use of a system according to any of the preceding use embodiments, wherein the system comprises a system according to any of the preceding system embodiments.

U8. The use of a system according to any of the preceding use embodiments, wherein the system is used to detect an anomaly and/or a defect in the object.

U9. The use of a system according to the preceding embodiment, wherein the system is used to identify a material or a geometry of the object.

U10. The use of a system according to any of the preceding use embodiments, wherein the system is used to identify if the object is different from another object.

U11. The use of the system according to the preceding embodiment, wherein the system is configured to receive one or more acceptable variations between the objects, and wherein the system is used to identify if the objects are different accounting for the one or more acceptable variations between the objects.

U11. The use of a system according to any of the preceding use embodiments, wherein the system is used in combination with a "jig", the jig being a structure that can hold one or more objects as well as one or more devices.

U12. The use of a system according to any of the preceding use embodiments and with the features of embodiment U8, wherein the system is used to identify any of a type, a size, and a location of the anomaly/defect.

U13. The use of a system according to any of the preceding use embodiments, wherein the system is used to determine a structural integrity of a structure and to determine a change of the structural integrity over time.

BRIEF FIGURE DESCRIPTION

DETAILED DESCRIPTION

Figure 1:
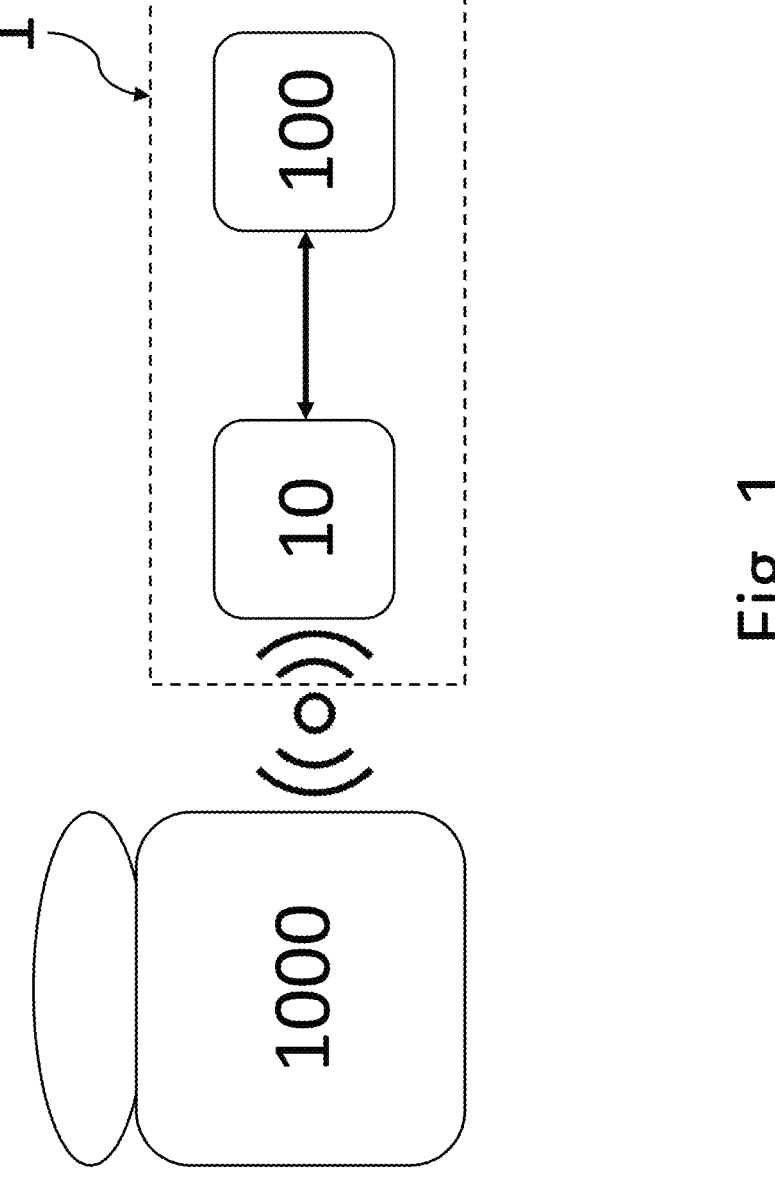
FIG. 1 depicts a system for detecting and/or analyzing a material or an object.

FIG. 1 depicts a system 1 for detecting and/or analyzing a material or an object 1000. The system 1 comprises a device 10 and a remote component 100, wherein the device 10 is configured to at least send data to the remote component 100. The system 1 may be configured to determine data related to the material or the object 1000 by means of the device 10 and the remote component 100. Particularly, the system 1 may be configured to determine the data related to the material or the object 1000 by means of a signal, particularly an acoustic signal, as will be described further below.

The data related to the material or the object 1000 may comprise data related to material properties of the material or the object 1000, for example, such as a composition and/or nature of the material or the object 1000. Embodiments of the present technology may be of particular relevance when the material or the object 1000 comprises a part of a container. The technology described herein may be of particular relevance for metallic containers, such as stainless-steel containers, that may be opaque to electromagnetic radiation. The container may comprise, for example, a shipping container, a wooden barrel, or any other container. The container may comprise a container that may be closed by a lid, for example. The data related to the material or the object 1000 may then be understood to also comprise data relating to the lid such as whether or not the lid is closed. The data may comprise data related to cracks in the container such as a presence/absence of cracks and/or a size of the crack and/or a location of the crack, if present.

The technology described herein may also be of particular relevance to check the quality and integrity of a (metal) object, such as an object comprising steel, brass, or other metal alloy that is manufactured, cast, forged, pressed, or welded into any shape or form.

Further, data related to the material or the object 1000 may comprise data related to contents of the container. For example, the data may comprise data related to a filling level of the container such as half-filled, full, or any other fraction thereof. The data related to the material or the object 1000 may alternatively, or additionally, comprise data related to a humidity inside the container. The data related to the material or the object 1000 may comprise data related to material properties of the contents of the container such as a particle size of the contents.

The data related to the material or the object 1000 may comprise data related to the object and/or to its structural integrity, geometry, status, material type, defect type, defect location, or other anomalies as described above.

Thus, generally, it may be understood that data related to the material or the object 1000 may comprise any data that may be extracted from acoustic properties of the material or the object 1000.

Figure 2:
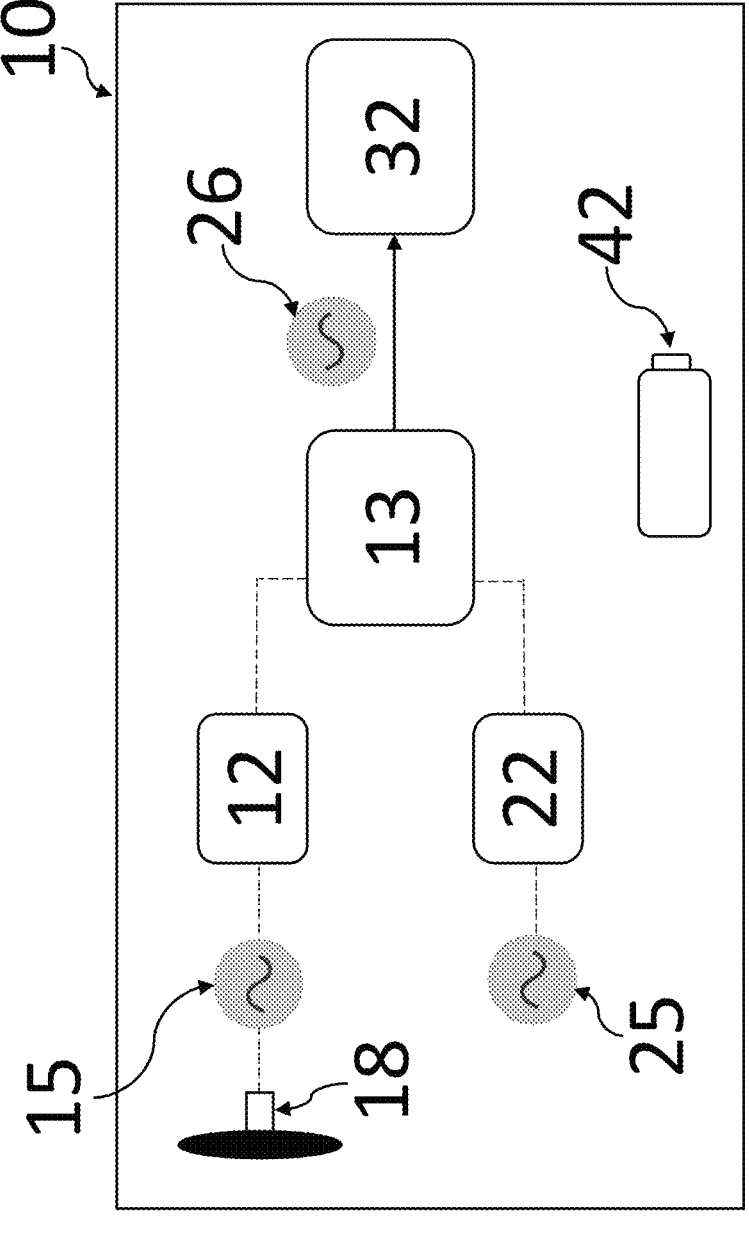
FIG. 2 depicts a device for use in detecting and/or analyzing a material or an object.

The device 10 of the system 1 may be configured to detect and/or analyze the material or the object 1000 and send data to the remote component 100, based on which, the remote component 100 may be configured to determine the data related to the material or the object 1000. An exemplary embodiment of the device 10 is depicted in FIG. 2. A maximum size of the device 10 in any dimension may be 50 cm, preferably 25 cm, further preferably 10 cm.

Note that, in some embodiments, the maximum size of the device 10 in any dimension may also be larger than 50 cm and the values above may only be considered exemplary, but not limiting. In particular, the dimensions of the device 10 may be varied according to a use of the device 10.

The device 10 may comprise a receiver 22 configured to detect a first signal 25. The first signal 25 may comprise an electrical signal. The first signal 25 may be generated, at least in part, by an acoustic signal. An acoustic signal may be understood to generally comprise a signal that is sustained by mechanical vibrations of a medium. For example, the receiver 22 may comprise means to convert an acoustic signal to an electrical signal, such as a microphone.

The first signal 25 may be generated, at least in part, by the material or the object 1000. Particularly, the first signal 25 may be generated, at least in part, by vibrations of at least a part of the material or the object 1000.

The device 10 may further comprise a source of energy 42, configured to power at least the receiver 22. The source of energy 42 may comprise a battery. The source of energy 42 may comprise a rechargeable battery. A capacity of the source of energy 42 may be between 50 mWh and 100 Wh, preferably between 75 mWh and 75 Wh, further preferably between 100 mWh and 50 Wh. Alternatively, the source of energy 42 may comprise an electrical grid. Note that a minimum size of the device 10 in any dimension may be limited by a source of energy 42.

Note that, in some embodiments, the capacity of the source of energy 42 may also be not limited to the values described above, and the values above may only be considered exemplary, but not limiting. In particular, the capacity of the source of energy 42 may be varied according to a use of the device 10.

The device 10 may further comprise a signal emitter 12 configured to emit a second signal 15. The second signal 15 may be based on a defined signal 14. The second signal 15 may preferably comprise an electrical signal. The second signal 15 may be used, at least in part, to generate an acoustic signal.

The second signal 15 may be based on a defined signal comprising a control parameter. The control parameter may comprise a plurality of control parameters. The control parameters may be used to characterize a shape, a length, an amplitude, or other suitable parameters of the second signal 15. In other words, the defined signal may be understood to comprise a set of control parameters needed to generate the second signal 15.

For example, the defined signal may comprise a defined shape, such as a rectangular pulse, a defined length, such as 1 microsecond, a defined value for the peak of the signal such as 5V, or any other suitable characteristic desired of the second signal 15.

The second signal 15 may comprise a plurality of frequencies. The plurality of frequencies may be based on the material or the object 1000 to be probed. The plurality of frequencies may comprise a bandwidth greater than 2 Hz. Preferably, the second signal 15 may comprise an ultra-wide band signal, i.e., a bandwidth of the second signal 15 may be at least 500 MHz. The second signal 15, comprising the plurality of frequencies, may comprise, for example, a rectangular signal, a chirped signal, or white noise. The plurality of frequencies may be of advantage in determining a variety of data related to the material or the object 1000 as described above, as well as in enhancing the accuracy of the determined data.

The device 10 may be programmable such that the second signal 15 to be generated by the signal emitter 12 may be programmed into the device 10. For example, as depicted in FIG. 2, the signal emitter 12 may be connected to a processing component 13 that may be programmed to accept, as input, any of the control parameters for the second signal 15. The processing component 13 may comprise, for example, a microprocessor. The processing component 13 may be configured to send any of the control parameters to the signal emitter 12.

The signal emitter 12 may be configured to emit the second signal 15 at regular or irregular time intervals. For example, the signal emitter 12 may be configured to emit the second signal 15 every 12 hours. This may be of advantage in enhancing an energy efficiency of the system 1. The length of the interval between successive emissions of the second signal 15 may also be programmed into the device 10, particularly the processing component 13 thereof, and may be chosen based on various factors, such as a desired frequency of determining the data related to the material or the object 1000. For example, it may be of advantage to determine data related to a container comprising the material 1000 every day if the contents of the container are perishable. However, if the contents of the container are non-perishable, it may be sufficient to determine the data related to the material 1000 only once every week, for example.

Further exemplarily, the device 10 may be used together with a production line to analyze one or more objects manufactured in the production line. In such embodiments, if a manufactured object is analyzed, every manufactured object may be analyzed at or next to the production line, for example. If a structure is being analyzed, such as a pipe or pipeline, it may be sufficient to determine the data related to the material or the object 1000 only once every day or every week, for example.

The intervals between successive emissions of the second signal 15 may not be fixed, however, and may, for example, be programmed to decrease over time. This may be of advantage, for example, in determining data related to the material 1000 of a container with perishable contents. The intervals between successive emissions of the second signal 15 may, however, be provided by another system, such as an industrial manufacturing system.

The device 10 may comprise an actuator 18 configured to apply a mechanical force on the material or the object 1000 causing it to vibrate. The actuator 18 may generally be understood to be configured to move in response to a signal, preferably an electrical signal. Further, it may be understood, that the actuator 18 may be configured such that motion of the actuator 18 is converted to a signal, preferably an electrical signal. By moving the actuator 18 in response to a desired signal (that may correspond to the second signal 15), a desired vibration of the material or the object 1000 may be effected.

Figure 3:
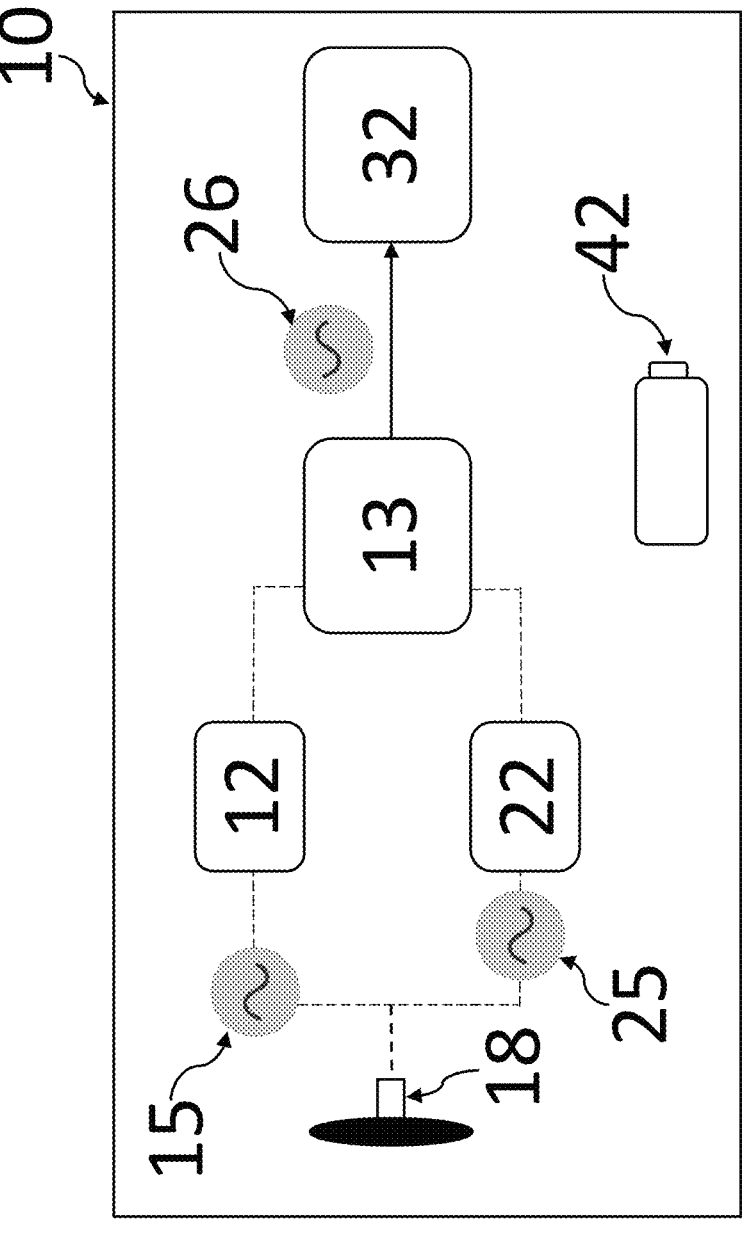
FIG. 3 depicts another embodiment of a device for use in detecting and/or analyzing a material or an object.

In some embodiments of the device 10, the actuator 18 may also be used to detect vibrations of the material or the object 1000, as will be described further below. This may be of advantage in improving the determination of the data related to the material or the object 1000. FIG. 3 depicts one such embodiment.

The device 10, particularly the receiver 22 thereof, may be configured to measure a response of the actuator 18. The response of the actuator 18 may comprise, at least in part, a response of the actuator 18 to vibrations of at least a part of the material or the object 1000. The response of the actuator 18 may comprise, at least in part, a response of the actuator 18 to the second signal 15, that may be called a signal response of the actuator 18. Note that, generally, these two responses may not be distinguished from each other when detected as a consequence of the second signal 15. However, as described above, one may determine the signal response of the actuator 18 in the absence of the material or the object 1000 and subtract it from the response (that may correspond to the first signal 25) of the actuator 18 detected in the presence of the material or the object 1000. This may be of advantage in enhancing the amount of information about the material or the object 1000 that may be gleaned using the device 10.

The response of the actuator 18 may be measured by measuring, for example, a configuration (position and/or orientation) of the actuator 18. For example, the device 10 may comprise a position sensor configured to measure a position of the actuator 18. Alternatively, or additionally, the change in configuration of the actuator 18 may be recorded as an electrical signal. This measurement may be used to determine, at least in part, the data related to the material or the object 1000.

The receiver 22 may be configured to detect the response to the second signal 15 (for example, of the material or the object 1000, and/or the signal response of the actuator 18 to the second signal 15) for a duration, that may be called a listening duration, after emission of the second signal 15. The listening duration may be between 0.05 and 20 seconds, preferably between 0.2 and 5 seconds, further preferably between 0.5 and 3 seconds, for example. The listening duration may be programmed into the receiver 22, and the receiver 22 may be appropriately configured therefor. For example, the listening duration may be programmed into the processing component 13. A higher listening duration may lead to better accuracy in determining data related to the material or the object 1000, but may also be resource-inefficient.

Alternatively, or additionally, the receiver 22 may be configured to detect the first signal 25 until an amplitude of the first signal 25 falls below a pre-defined threshold. For example, the receiver 22 may be configured to detect a first signal 25 with an amplitude (or equivalent energy) between 1V and 150V, preferably between 2V and 50V, further preferably between 3V and 20V. This may be of advantage, for example, when the material 1000 comprises the material 1000 of a closed container, and the device 10 is used to detect an opening/closing of the container without stimulation by the second signal 15.

In embodiments of the present technology the actuator 18 may comprise a piezoelectric material such as Lead Zirconate Titanate Barium, Lead Titanate, Bismuth Sodium Titanate, or any other suitable piezoelectric materials. For example, the actuator 18 may comprise a piezoelectric disk. Piezoelectric disks may provide better insulation against detecting vibrations of the environment and as such may be of advantage in significantly detecting vibrations of the material or the object 1000, or a part thereof, alone.

The device 10, particularly the actuator 18 thereof, may be arranged to the material or the object 1000 such that vibrations of the actuator 18 may be transmitted to the material or the object 1000, or at least a part thereof. The device 10, particularly the receiver 22 and/or the actuator 18 thereof, may also be arranged on to the material or the object 1000 such that vibrations of the material or the object 1000, or at least a part thereof, may be transferred to the receiver 22 and/or the actuator 18. It may be advantageous to arrange the device 10 such that the transfer of vibrations of the actuator 18 or of the material or the object 1000 is efficient, and loss of energy is minimized. Preferably, the device 10 may be attached to the material or the object 1000, such that the shortest distance between the device 10 and the material or the object 1000 is less than 30 mm, preferably less than 20 mm, further preferably less than 10 mm, yet further preferably less than 5 mm.

The device 10 may further comprise a communication unit 32. The communication unit 32 may be configured to communicate with the remote component 100. The receiver 22 may be configured to send at least a part of the first signal 25 to the processing component 13. The change in configuration of the actuator 18 may also be converted to an electrical/non-electrical signal, and this signal may also be sent to the processing component 13.

In particular, the receiver 22 may detect the first signal 25, and send it to the processing component 13. The processing component 13 may be configured to send a transmitted signal 26, based, at least in part, on the first signal 25, or at least a part thereof, received from the receiver 22 to the communication unit 32. For example, the transmitted signal 26 may comprise the first signal 25 detected over the whole listening duration, or only a part thereof.

The communication unit 32 may be configured to also receive the second signal 15, or the defined signal, or the control parameter thereof, on which the second signal 15 is based (from the processing component 13, for example). The communication unit 32 may be configured to also send the second signal 15 (or the control parameter thereof) and/or to the remote component 100. The communication unit 32 may be configured to communicate with the remote component 100 wirelessly, for example, by means of electromagnetic radiation. For example, the communication unit 32 may comprise a radio module using frequencies between 300 MHz and 8 GHz.

In the following, embodiments of the present technology will be described with respect to a part of the transmitted signal 26. However, it is to be understood that the part of the transmitted signal 26 may comprise the entire transmitted signal 26 detected over the listening duration, or just a part thereof.

The communication unit 32 may be configured to send the part of the transmitted signal 26 received from the processing component 13 to the remote component 100. The remote component 100 may be configured to analyze the part of the transmitted response signal 26 to determine the data related to the material or the object 1000. An exemplary embodiment of the remote component 100 is depicted in FIG. 3.

The remote component 100 may also comprise a communication unit, the remote communication unit 132, configured to at least receive data from the communication unit 32 of the device 10. The remote communication unit 132 may be configured to receive the part of the transmitted signal 26 from the device 10 and send it to a data processing unit 102 of the remote component 100. The data processing unit 102 may be configured to analyze the part of the transmitted signal 26 to determine the data related to the material or the object 1000. Various analyses that may be carried out by the data processing unit 102 on the part of the transmitted signal 26 will now be described. Note that these steps should be considered exemplary, but not limiting, of the present technology. Further, not all steps may be carried out in all embodiments of the present technology.

The data processing unit 102 may be configured to determine spectral content in the part of the transmitted signal 26. For example, the data processing unit 102 may carry out a Fourier transformation of the part of the transmitted signal 26. The spectral content may be determined for the whole part of the transmitted signal 26, or for sections (in time) of the part of the transmitted signal 26. The spectral content for different temporal sections of the part of the transmitted signal 26 may indicate the frequency response of the material or the object 1000 over time. The spectral content, of the whole part of the transmitted signal 26 or of the different temporal sections of the part of the transmitted signal 26, may be used to determine, at least in part, the data related to the material or the object 1000.

The data processing unit 102 may comprise a model to determine the data related to the material or the object 1000. The model may be configured to accept, as input, any of the part of the transmitted signal 26 or the spectral content of the part of the transmitted signal 26 as described above, and/or the second signal 15 (or the control parameter thereof) emitted by the signal emitter 12, and based thereon, to determine the data related to the material or the object 1000. For example, the model may accept as input the part of the transmitted signal 26 and the second signal 15. Or, the model may accept as input the spectral content of the part of the transmitted signal 26, and the second signal 15.

Generally, it may be understood that the model may be configured to accept as input at least one of the part of the transmitted signal 26 or its spectral content, and the model may be further configured to accept as input any of the part of the transmitted signal 26, the spectral content of the part of the transmitted signal 26, the second signal 15 emitted by the signal emitter 12, or the control parameter of the second signal 15.

The model may comprise a model based on physical laws and may comprise, for example, comparing the part of the transmitted signal 26 (or its spectral content) detected by the receiver 22 to an expected response signal. The expected response signal may be determined based on the second signal 15, or the control parameter thereof, emitted by the signal emitter 12. The model may also be based, at least in part, on numerical simulations that may take into account the geometry of the material or the object 1000 and/or the environment around the device 10.

The model may be configured to determine, based on the part of the transmitted signal 26, an acoustic phase of the transmitted signal 26, a run time of the acoustic signal through the material or the object 1000 that may be used to determine, for example, a speed of sound through the material or the object 1000, a dampening over time of one or more frequencies in the transmitted signal 26, or a capacity of the piezo model.

Additionally, or alternatively, the model may comprise an artificial intelligence-based model. Preferably, the model may comprise, at least in part, the artificial intelligence-based model. The artificial intelligence-based model may comprise a model based on supervised learning such that the artificial intelligence-based model may have to be trained prior to using it to determine the data related to the material or the object 1000. The artificial intelligence-based model may comprise a neural network, such as a convolutional neural network, a recurrent neural network, a transformer.

The artificial intelligence-based model may be configured to accept as input any of the part of the transmitted signal 26, the spectral content of the part of the transmitted signal 26, or the second signal 15, or the control parameter thereof, emitted by the signal emitter 12. An output of the artificial intelligence-based model may comprise a label that may be used to determine the data related to the material or the object 1000. For example, the artificial intelligence-based model may be used to determine a material of the material or the object 1000 from one among a plurality of, say 10, different materials. Then, the artificial intelligence-based model may be configured to output a label between 1 and 10 that may be used to identify the material of the material or the object 1000 from the 10 different materials.

Further exemplarily, as described above, the material or the object 1000 may comprise a part of a container with a lid and the artificial intelligence-based model may be used to determine data related to whether or not the container is closed. In this case, the output of the artificial intelligence-based model may comprise a binary label indicating the state of the container.

Generally, the artificial intelligence-based model may be configured to output a plurality of labels, each of which may be used to determine a characteristic of the material or the object 1000. For example, the artificial intelligence-based model may output two labels, the first of which may be between 1 and 10 and may indicate which of 10 different materials are comprised in the material or the object 1000, and the second of which may be either 0 or 1 and may indicate that a container comprising the material 1000 is open or closed. Thus, generally, the system 1 may be used to obtain, at least significantly, real-time updates on the material or the object 1000, particularly the material 1000 of a shipping container.

The data processing unit 102 may be configured to communicate with a memory unit 112 of the remote component 100. The memory unit 112 may be configured to store training data for the artificial intelligence-based model described above. For example, the memory unit 112 may comprise a plurality of data elements, wherein each of the plurality of data elements is one of the part of the transmitted signal 26, the spectral content of the part of the transmitted signal 26, or the second signal 15, or the control parameter thereof, emitted by the signal emitter 12. Each of the plurality of data elements may further comprise 'correct' (or desired) values for each of the plurality of labels that may characterize the material or the object 1000, and that may be predicted by the artificial intelligence-based model. Training of the artificial intelligence-based model may comprise optimizing a difference between the values of the labels predicted by the artificial intelligence-based model and the 'correct' values as stored in the memory unit 112.

The trained artificial intelligence-based model may also be stored in the memory unit 112 of the remote component 100 and may be retrieved from the memory unit 112 for predicting a label of the part of the transmitted response signal 26 or its spectral content.

Note that while the remote component 100 has been described above as comprising one each of the remote communication unit 132, the data processing unit 102, and the memory unit 112, in embodiments of the present technology the remote component 100 may comprise a plurality of any of these. The present invention may also be understood to be directed to these embodiments.

Figure 4:
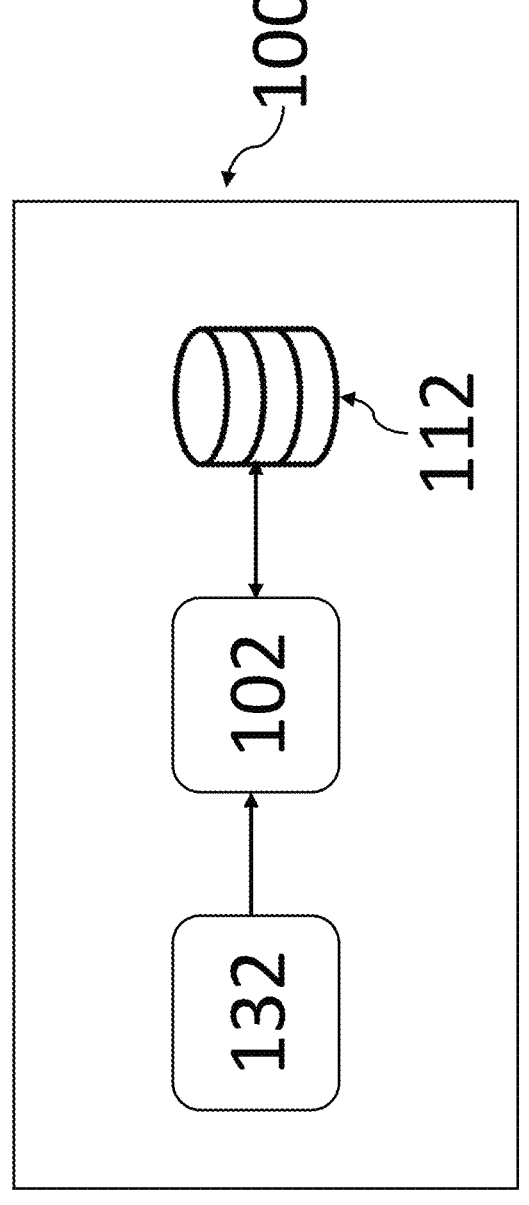
FIG. 4 depicts a remote component for use in detecting and/or analyzing a material or an object.

FIG. 4 depicts a remote component for use in detecting and/or analyzing a material or an object.

Overall, embodiments of the present technology are directed towards a system comprising a device and a remote component, and a method for detecting and/or analyzing materials or objects that may allow non-invasive, more efficient, and robust probing of materials, particularly for containers, and of objects.

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

We claim:

1. A device for detecting and/or analyzing a material or an object, wherein the device comprises:

a receiver configured to detect a first signal, wherein the first signal is generated, at least in part, by vibrations of at least a part of the material or the object, a signal emitter configured to emit a second signal, and an actuator configured to apply a mechanical force on the material or object causing it to vibrate, the actuator configured to move in response to the second signal to effect a desired vibration or motion of the material or the object, wherein the first signal is based, at least in part, on a response to the second signal, and wherein the first signal is generated, at least in part, by an acoustic signal, and wherein the device is configured to communicate with a remote component, and to send a signal to the remote component based, at least in part, on the first signal.

2. The device according to claim 1, wherein the response to the second signal comprises, at least in part, a response of the material or the object, and wherein the response of the material or the object is generated, at least in part, by vibrations of at least a part of the material or the object.

3. The device according to claim 1, wherein the signal emitter is configured to emit the second signal based on a defined signal, wherein the defined signal comprises a control parameter.

4. The device according to claim 3, wherein the device comprises a processing component and a communication unit, wherein the processing component is configured to send the control parameter to the communication unit.

5. The device according to claim 1, wherein the second signal, or at least a part thereof, is used to generate an acoustic signal.

6. A remote component configured to communicate with a device, wherein the remote component is configured to at least receive data from the device and, based thereon, to determine data related to a material or an object, and wherein the device comprises a device according to claim 1.

7. The remote component according to claim 6, wherein the remote component comprises a data processing unit configured to process input data, the data processing unit configured to determine the data related to the material or the object using a model.

8. The remote component according to claim 7, wherein the model is based, at least in part, on physical laws, and/or on numerical simulations.

9. The remote component according to claim 7, wherein the model comprises, at least in part, an artificial intelligence-based model.

10. The remote component according to claim 9, wherein an output of the artificial intelligence-based model comprises a label, wherein the remote component, particularly the data processing unit thereof, is configured to determine the data related to the material or the object based, at least in part, on the label.

11. The remote component according to claim 9, wherein the artificial intelligence-based model comprises a neural network, and wherein the neural network comprises any of a convolutional neural network, a recurrent neural network, or a transformer.

12. A system for detecting and/or analyzing a material or an object, wherein the system comprises a device according to claim 1, and wherein the system is configured to detect a first signal, and to determine, based, at least in part, on the first signal, data related to the material or the object.

13. The system according to claim 12, wherein the system comprises a remote component according to claim 9.

14. The device according to claim 1, wherein the device comprises a processing component, wherein the processing component is configured to generate a transmitted signal based, at least in part, on the first signal detected by the receiver, wherein the device comprises a communication unit, wherein the communication unit is configured to at least receive data from the processing component, and wherein the processing component is configured to send at least a part of the transmitted signal to the communication unit.

15. The device according to claim 14, wherein the communication unit is configured to send the transmitted signal, or a part thereof, to the remote component.

16. A method for detecting and/or analyzing a material or an object, wherein the method comprises:

emitting a second signal, in response to the second signal, applying a mechanical force on the material or object, causing it to vibrate, detecting a first signal, communicating with a remote component, sending a signal based, at least in part, on the first signal to the remote component, and determining, based, at least in part, on the first signal, data related to the material or the object, wherein the first signal is based, at least in part, on a response to the second signal, and wherein the first signal is generated, at least in part, by an acoustic signal.

17. A use of the system according to claim 12 to detect and/or analyze an object or the material of a container.

18. The use of the system according to claim 17, wherein the system is used to detect an anomaly and/or a defect in the object.

19. The use of the system according to claim 17, wherein the system is used to determine a structural integrity of a structure and to determine a change of the structural integrity over time.

* * * * *